United States Patent
Akenine-Moller et al.

(10) Patent No.: US 9,153,008 B2
(45) Date of Patent: Oct. 6, 2015

(54) CACHING FOR REDUCED DEPTH AND/OR COLOR BUFFER BANDWIDTH

(71) Applicant: Intel Corporation, Santa Clara, CA (US)

(72) Inventors: Tomas G. Akenine-Moller, Lund (SE); Jon N. Hasselgren, Bunkeflostrand (SE); Jim K. Nilsson, Lund (SE)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/894,506

(22) Filed: May 15, 2013

(65) Prior Publication Data

US 2014/0340414 A1    Nov. 20, 2014

(51) Int. Cl.
*G06T 15/00* (2011.01)
*G06T 1/60* (2006.01)

(52) U.S. Cl.
CPC ............... *G06T 1/60* (2013.01); *G06T 15/005* (2013.01)

(58) Field of Classification Search
CPC ........... G06T 11/40; G06T 1/60; G06T 17/20; G06T 15/405; G06T 2210/52
See application file for complete search history.

(56) References Cited

U.S. PATENT DOCUMENTS

| | | | |
|---|---|---|---|
| 2007/0139440 A1* | 6/2007 | Crow et al. | 345/614 |
| 2009/0160857 A1* | 6/2009 | Rasmusson et al. | 345/422 |
| 2011/0078427 A1* | 3/2011 | Shebanow et al. | 712/244 |
| 2012/0280992 A1* | 11/2012 | Shebanow et al. | 345/420 |
| 2012/0281004 A1* | 11/2012 | Shebanow et al. | 345/557 |

OTHER PUBLICATIONS

U.S. Appl. No. 13/690,401, filed Nov. 30, 2012 entitled "Secure Environment for Graphics Processing Units" (28 pages).

* cited by examiner

*Primary Examiner* — Kee M Tung
*Assistant Examiner* — Ryan M Gray
(74) *Attorney, Agent, or Firm* — Trop, Pruner & Hu, P.C.

(57) ABSTRACT

In accordance with some embodiments, caching may be improved for tiles on shared edges between triangles. In some embodiments, the technique may be used for either color and depth caches or both caches.

21 Claims, 4 Drawing Sheets

CACHING FOR REDUCED DEPTH AND/OR COLOR BUFFER BANDWIDTH

BACKGROUND

This relates generally to graphics processing for computers and, particularly, to caching data in a depth or color buffer cache.

In order to increase performance for processing graphics, memory bandwidth reduction techniques are employed. One way to decrease the bandwidth requirement is to perform color or depth buffer compression. A graphics system may use a color buffer where the colors of the pixels are drawn and a depth buffer where the depth of each pixel is stored. During rendering, these buffers are read and written to, and often the same pixel is accessed several times for both buffers. These read and write accesses are expensive in terms of energy consumption and may advantageously be reduced to the extent possible, in particular for user terminals with limited power supplies, such as mobile devices.

BRIEF DESCRIPTION OF THE DRAWINGS

Some embodiments are described with respect to the following figures.

DETAILED DESCRIPTION

In accordance with some embodiments, caching may be improved for tiles on shared edges between triangles. In some embodiments, the technique may be used for either color and depth caches or both caches.

Figure 1:
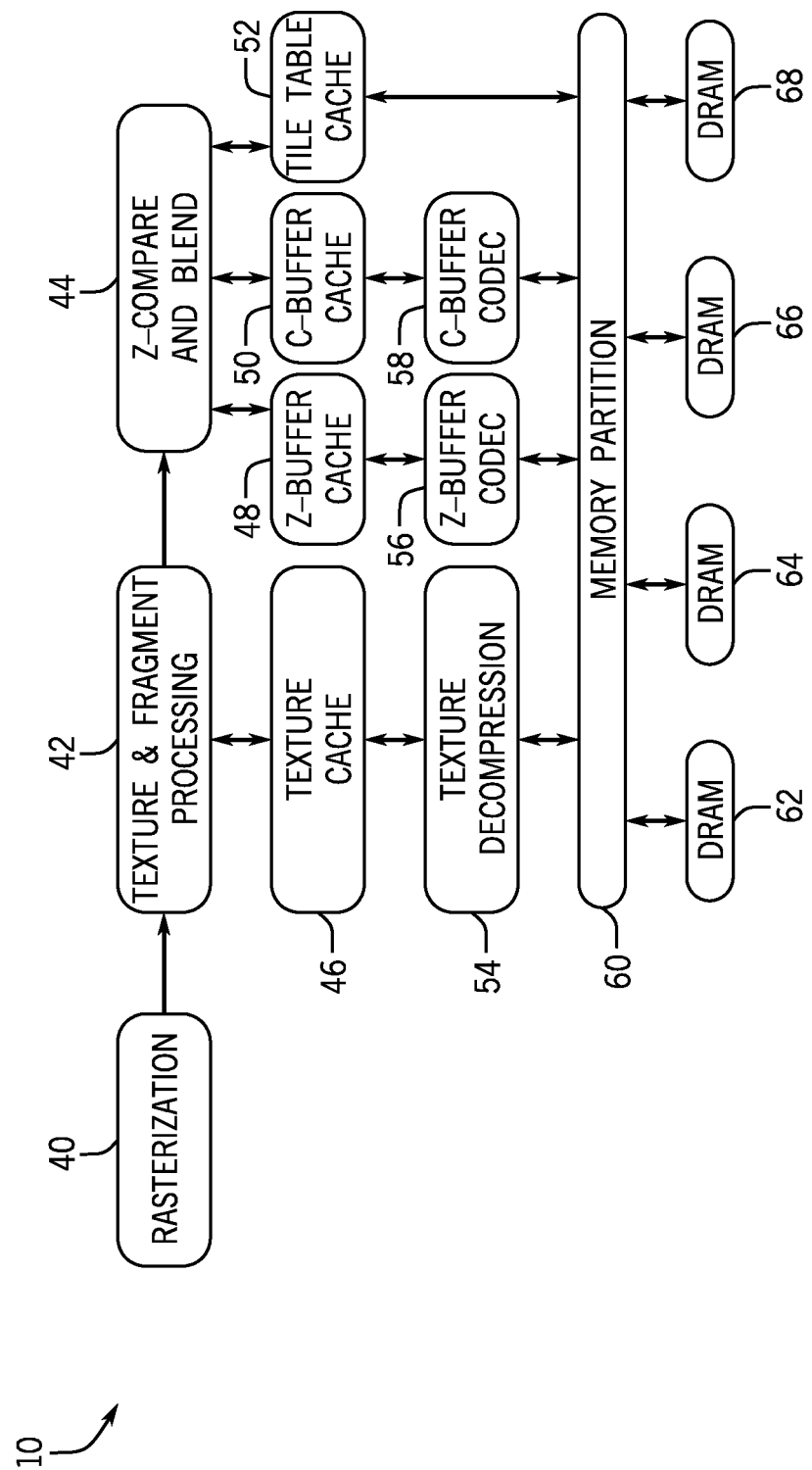
FIG. 1 is a schematic depiction of one embodiment.

In FIG. 1, a graphics processor 10 may include a rasterization pipeline including a rasterization unit 40, a texture and fragment processing unit 42, and a depth or Z compare and blend unit 44. Each of these units may be implemented in whole or in part by software or hardware in some embodiments.

The texture and fragment processing unit 42 is coupled to a texture cache 46. The cache 46 is in turn coupled to a memory partition 60 through a texture decompression module 54. Thus, texture information stored in the cache may be decompressed between the memory partition and the cache.

The depth compare and blend unit 44 is coupled to a depth buffer cache 48, a color buffer cache 50 and a tile table cache 52. In turn, the depth buffer cache 48 is coupled to the memory partition 60 through the depth buffer coder/decoder (codec) 56. Likewise, the color buffer cache 50 couples the memory partition 60 through the color buffer coder/decoder (codec) 58. The memory partition 60 may be coupled to dynamic random access memory (DRAM) 62, 64, 66 and 68 which may be part of system memory. In some embodiments, a unified cache may be used that includes the texture cache, the depth buffer cache and the color buffer cache.

In some embodiments, a unified codec may replace the units 54, 56, and 58. Various configurations are described in further detail in the article, *Floating Point Buffer Compression in a Unified Codec Architecture by Ström*, et al. Graphics Hardware (2008).

In some embodiments, a rasterizer rasterizes the pixels or samples inside a triangle and is tile based, meaning that it rasterizes all pixels or samples within a tile before continuing to the next tile. A tile is a rectangular region in screen space in one embodiment. The tiles are non-overlapping and collectively they cover the entire screen space.

A bounding box of a triangle may be traversed and, for each tile inside the box, a test is performed by the rasterization unit 40 that determines whether the tile overlaps with the triangle. If it does not, then processing for that tile is finished for that triangle.

Otherwise, processing of the tile continues downstream in the pipeline. Next, the tile versus triangle test may be performed in a hierarchical manner, in a number of steps with continually smaller tiles. Finally, a sample versus triangle inside test is performed.

Figure 2:
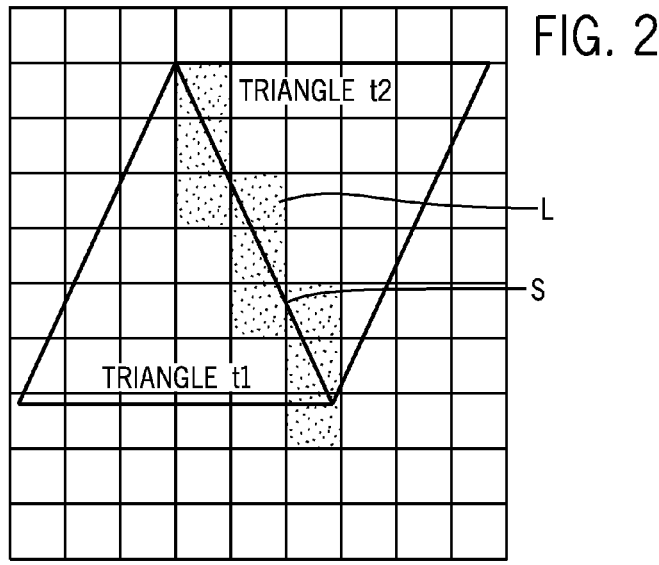
FIG. 2 is a flow chart for one embodiment.

Triangles are often submitted in different connected ways, for example, in triangle strips. As shown in FIG. 2, a triangle strip for two triangles t1 and t2 shows that one triangle edge S is shared between the two triangles. Since this is a common case, it is important to optimize for the shared triangle edges. In FIG. 2, the tiles L are square and the assumption is that each tile contains 8×8 pixels or samples. In such an example, each tile would contain 8×8 depth values and 8×8 color values, as well, under the assumption that each pixel only contains one sample. For multi-sampling anti-aliasing, each pixel may contain N samples, and hence a tile may contain 8×8×N depth/color values. There can also be other per sample values, e.g., stencil, etc.

The shaded tiles are shared between triangles one and two and the same region of the depth and color buffers is used for both tiles. When the rasterization unit 40 is processing, the first triangle that shares a shared tile so that its contents may be in a color and depth cache, there is no benefit from evicting this content from the caches before the second triangle has accessed these regions. Thus, by marking the tiles that overlap adjacent triangles in the depth and buffer caches as "more important," until they have been visited by both triangles. The marking of a tile as more important can then guide the cache replacement and eviction policy, by prioritizing to keep cache lines corresponding to more important tiles. Memory bandwidth may thereby be reduced, in some embodiments.

In one embodiment, a sequence looks ahead to the triangle being processed after the current one. Assuming the system is currently processing triangle t1, and the triangle following triangle t1 is called triangle t2, there are many ways to determine whether there is a shared edge between the triangles. If the triangles are subsequent triangles in a triangle strip or a triangle fan, then it is immediately known which triangle edges are shared. Even if this is not the case, there can still be shared triangle edges and, in these cases, one can simply compare the edges in the first triangle against the edges in the second triangle and look for the same vertex indices. If the circumstances are such that neither of these methods is possible, one can also compare all vertex attributes to check whether they are the same.

If there is a shared edge between two triangles and the second triangle is facing backwards, and if backface culling is enabled, then the second triangle is culled and not processed any further. Thus, the method described herein should not be used in such a case, because the tiles overlap and the shared triangle edge between triangles t1 and t2 will not be visited by t2. If backface culling is disabled, then the triangles facing backwards will be rasterized, so in all other cases the techniques described herein marks the tiles that overlap with the shared edges as more important if there is also at least one sample in the tile that is inside the triangle. However, it is important that, for second tiles that overlap the same shared edge, the corresponding more important tile is unmarked as not being more important any longer. In this case, there is no requirement that the sample should also be inside the triangle, because this may cause a tile to get stuck in the cache forever.

An alternative solution is to do a sweep through the elements in the cache and clear the more important status of all tiles before rasterizing a new triangle. This ensures that the more important tiles never get stuck in the cache, but could possibly reduce the effectiveness, in some embodiments, since tiles on the edge between triangles might be evicted from the cache before being accessed for the second triangle.

In practice, there could be a single bit per cache line that identifies the cache line as more important, for example, when the bit is set to one. When the processing of triangle t2 visits a tile whose cache line has its bit set to one, it will set it to zero. As another example, there may be a counter for the least recently used eviction policies and, in this case, a single bit pattern can be reserved for more important tiles. That is, if the counter has four bits, 1111 may be reserved as an indicator of a more important tile, for example. The rasterizer's tile test plus the rasterizer's sample tester communicate with the color and depth caches to determine which tiles should be marked as more important and which should be unmarked. This information is then sent down the pipeline as a single bit per tile that survives the tile test, in some embodiments.

Figure 3:
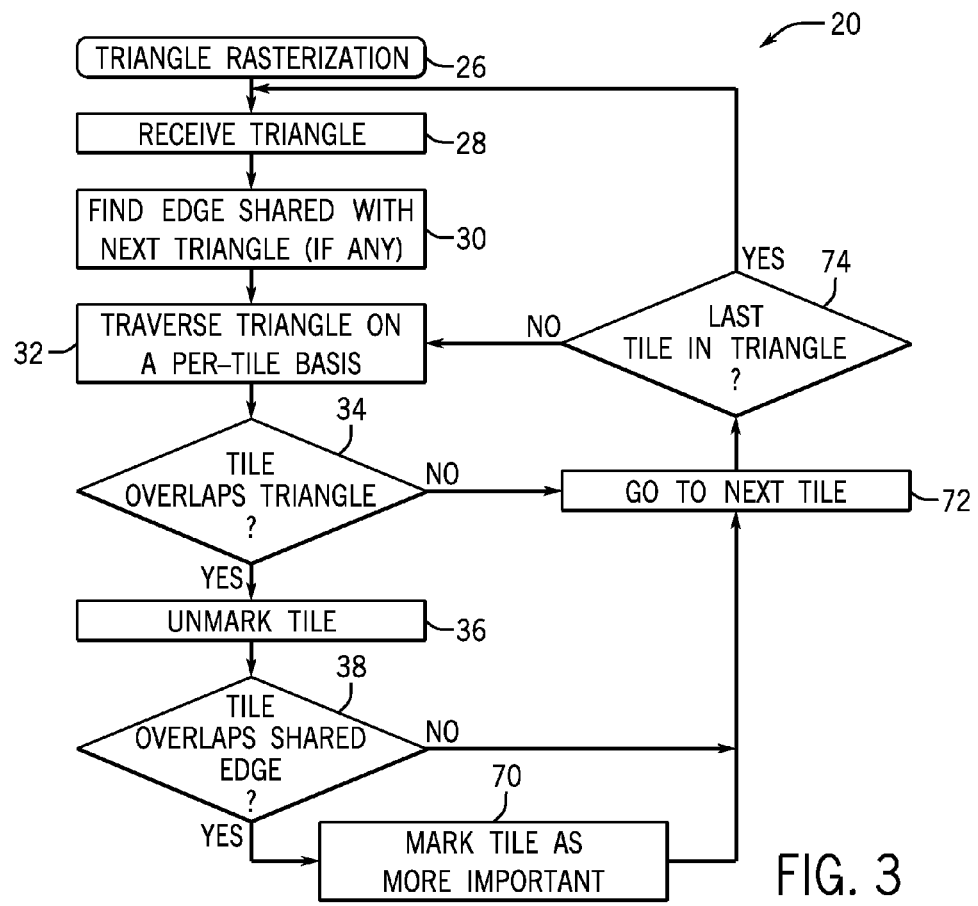
FIG. 3 is a depiction of triangles being rendered according to one embodiment.

Referring to FIG. 3, a sequence 20 may be implemented in software, firmware, and/or hardware. In software and firmware embodiments, it may be implemented by computer executed instructions stored in one or more non-transitory computer readable media, such as a magnetic, optical, or semiconductor storage. For example, it may be stored in a memory associated with rasterization unit 40 of FIG. 1.

The sequence 20 begins with triangle rasterization, as indicated in block 26. Next, the triangle is received, as indicated in block 28. A shared edge is found between the received triangle and the next triangle, as indicated in block 30. Examples of techniques for determining a shared edge are described earlier.

Then the triangle is traversed by a rasterization unit 40 on a per tile basis, as shown in block 32. A check at diamond 34 determines whether a tile overlaps the triangle. If so, the tile is unmarked, as indicated in block 36. This would be the case where a tile was marked more important for a previous triangle and now the subsequent triangle is being accessed. In such case, the previous overlapping is no longer useful since the analysis has moved on to a different triangle edge.

Next, a check at diamond 38 determines whether the tile overlaps the shared edge determined in block 30. If so, the tile is marked as more important, as indicated in block 70, and is not culled, but, rather, is retained in a cache in rasterization unit 40 for processing with the next adjacent triangle that shares the shared edge. Then the flow proceeds to the next tile in block 72. A check at diamond 74 determines whether this is the last tile in the triangle. If so, the flow goes back to receive the next triangle and, otherwise, it continues to process the tiles in the triangle until all the tiles in the triangle have been processed. If the tile does not overlap the triangle, as determined in diamond 34, then no further processing is needed and the flow goes on to process the next tile, as indicated in block 72.

Figure 4:
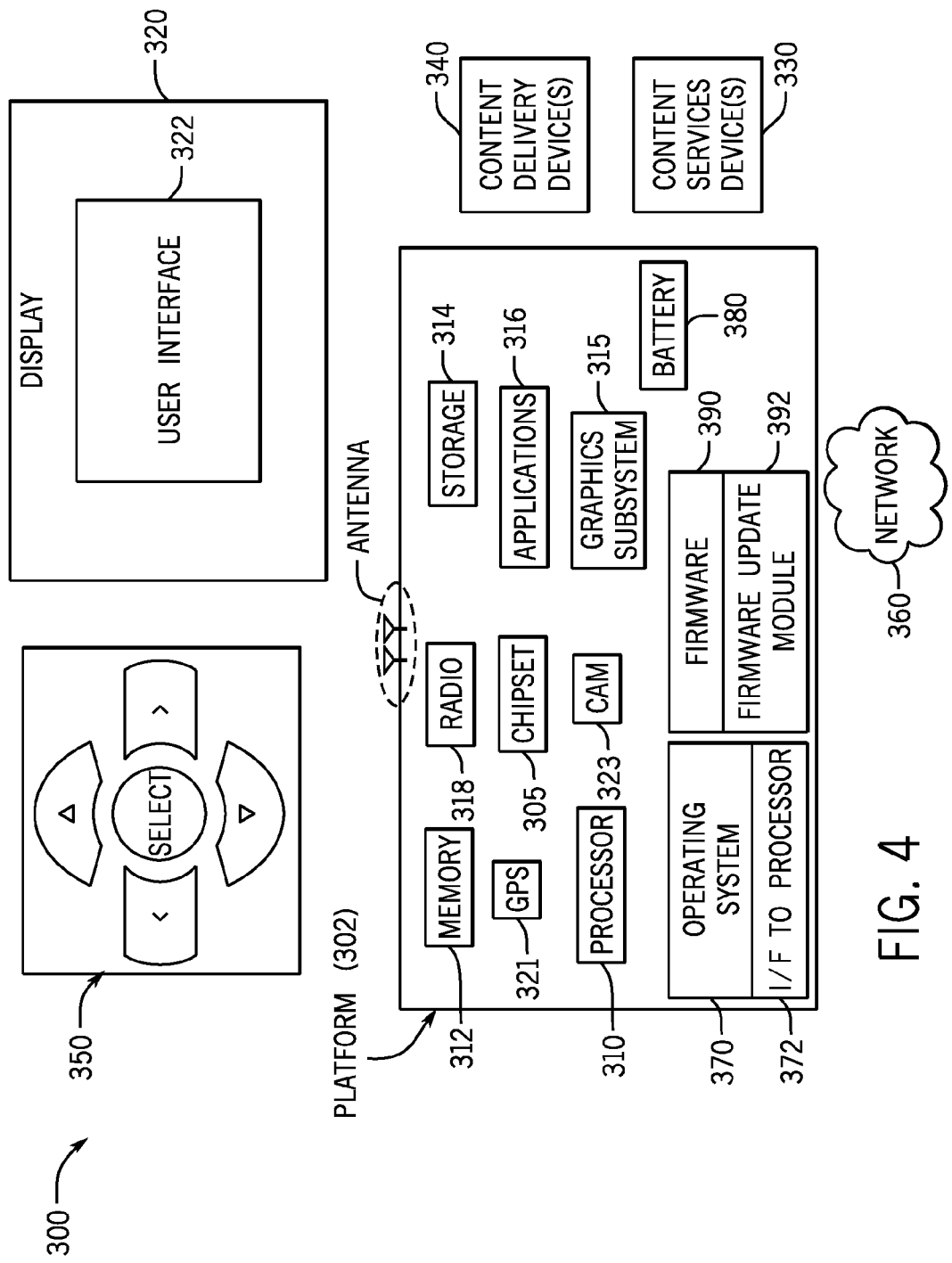
FIG. 4 is a system depiction for one embodiment.

FIG. 4 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth. The processor may implement the sequence of FIG. 3 together with memory 312.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
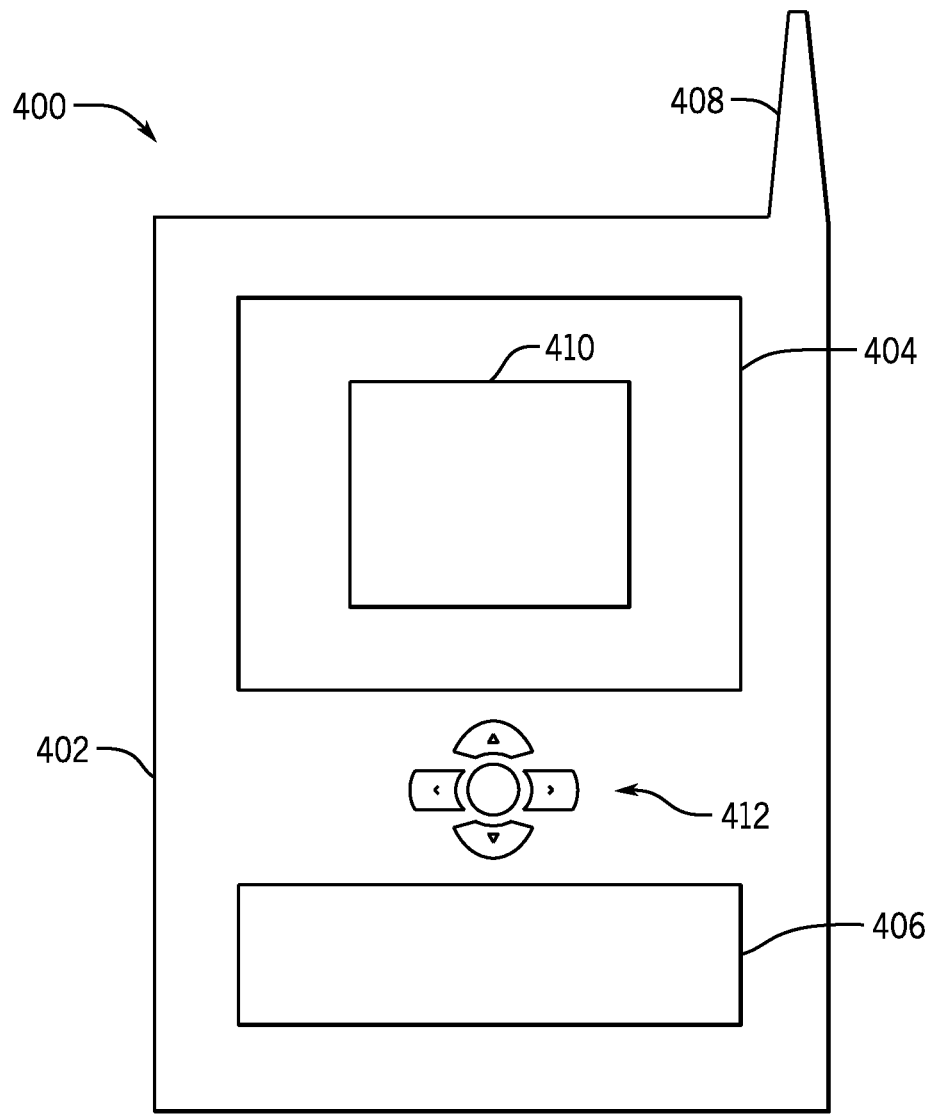
FIG. 5 is a front elevational view for one embodiment.

As described above, system 300 may be embodied in varying physical styles or form factors. FIG. 5 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIG. 3 in software and/or firmware embodiments.

As shown in FIG. 5, device 400 may comprise a housing 402, a display 404, an input/output (I/O) device 406, and an antenna 408. Device 400 also may comprise navigation features 412. Display 804 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a computer executed method comprising determining, via computer, whether edges of a first and second triangle are shared, traversing the first triangle on a per-tile basis, if a tile overlaps the first triangle, then unmarking the tile in a memory, and if the tile overlaps a shared edge, then marking the tile. The method may also include implementing a color cache wherein tiles overlapping shared edges are marked. The method may also include implementing a depth cache wherein tiles overlapping shared edges are marked. The method may also include implementing color and depth caches wherein tiles overlapping shared edges are marked. The method may also include refraining from evicting a marked tile from a color or depth cache. The method may also include using a single bit per cache line marking a tile. The method may also include reserving a multi-bit pattern to mark a tile.

Another example embodiment may be one or more non-transitory computer readable media storing instructions executed by a computer to perform a sequence comprising determining whether edges of a first and second triangle are shared, traversing the first triangle on a per-tile basis, if a tile overlaps the first triangle, then unmarking the tile in a memory, and if the tile overlaps a shared edge, then marking the tile. The media may store said sequence including implementing a color cache wherein tiles overlapping shared edges are marked. The media may store said sequence including implementing a depth cache wherein tiles overlapping shared edges are marked. The media may store said sequence including implementing color and depth caches wherein tiles overlapping shared edges are marked. The media may store said sequence including refraining from evicting a marked tile from a color or depth cache. The media may store said sequence including using a single bit per cache line marking a tile. The media may store said sequence including reserving a multi-bit pattern to mark a tile.

In another example embodiment may be an apparatus comprising a processor to determine whether edges of a first and second triangle are shared, traverse the first triangle on a per-tile basis, if a tile overlaps the first triangle, then unmarking the tile in a memory, and if the tile overlaps a shared edge, then marking the tile, and a storage coupled to said processor. The apparatus may include said processor to implement a color cache wherein tiles overlapping shared edges are marked. The apparatus may include said processor to implement a depth cache wherein tiles overlapping shared edges are marked. The apparatus may include said processor to implement color and depth caches wherein tiles overlapping shared edges are marked. The apparatus may include said processor to refrain from evicting a marked tile from a color or depth cache. The apparatus may include said processor to use a single bit per cache line marking a tile. The apparatus may include said processor to reserve a multi-bit pattern to mark a tile. The apparatus may include said processor to include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the claims. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims.

While a limited number of embodiments have been described, those skilled in the art will appreciate numerous modifications and variations therefrom. It is intended that the appended claims cover all such modifications and variations as fall within the true spirit and scope of the claims.

What is claimed is:

1. A computer executed method comprising:
   determining, via computer, whether edges of a first and second triangle are shared;
   traversing the first triangle on a per-tile basis;
   if a tile overlaps the first triangle, then unmarking the tile in a memory;
   if the tile overlaps a shared edge, then marking the tile; and
   determining whether to evict a tile including refraining from evicting a marked tile from a color or depth cache and, instead, evicting an unmarked tile.

2. The method of claim 1 including wherein marking tiles includes implementing a color cache wherein tiles overlapping shared edges are marked.

3. The method of claim 1 including wherein marking tiles includes implementing a depth cache wherein tiles overlapping shared edges are marked.

4. The method of claim 1 including wherein marking tiles includes implementing color and depth caches wherein tiles overlapping shared edges are marked.

5. The method of claim 1 including using a single bit per cache line marking a tile.

6. The method of claim 1 including reserving a multi-bit pattern to mark a tile.

7. One or more non-transitory computer readable media storing instructions executed by a computer to perform a sequence comprising:
   determining whether edges of a first and second triangle are shared;
   traversing the first triangle on a per-tile basis;
   if a tile overlaps the first triangle, then unmarking the tile in a memory;
   if the tile overlaps a shared edge, then marking the tile; and
   determining whether to evict a tile including refraining from evicting a marked tile from a color or depth cache and, instead, evicting an unmarked tile.

8. The media of claim 7, said sequence including wherein marking tiles includes implementing a color cache wherein tiles overlapping shared edges are marked.

9. The media of claim 7, said sequence including wherein marking tiles includes implementing a depth cache wherein tiles overlapping shared edges are marked.

10. The media of claim 7, said sequence including wherein marking tiles includes implementing color and depth caches wherein tiles overlapping shared edges are marked.

11. The media of claim 7, said sequence including using a single bit per cache line marking a tile.

12. The media of claim 7, said sequence including reserving a multi-bit pattern to mark a tile.

13. An apparatus comprising:
    a processor to determine whether edges of a first and second triangle are shared, traverse the first triangle on a per-tile basis, if a tile overlaps the first triangle, then unmark the tile in a memory, if the tile overlaps a shared edge, then mark the tile, determine whether to evict a tile including refraining from evicting a marked tile from a color or depth cache and, instead, evict an unmarked tile; and
    a storage coupled to said processor.

14. The apparatus of claim 13, wherein marking tiles includes said processor to implement a color cache wherein tiles overlapping shared edges are marked.

15. The apparatus of claim 13, wherein marking tiles includes said processor to implement a depth cache wherein tiles overlapping shared edges are marked.

16. The apparatus of claim 13, wherein marking tiles includes said processor to implement color and depth caches wherein tiles overlapping shared edges are marked.

17. The apparatus of claim 13, said processor to use a single bit per cache line marking a tile.

18. The apparatus of claim 13, said processor to reserve a multi-bit pattern to mark a tile.

19. The apparatus of claim 13 including an operating system.

20. The apparatus of claim 13 including a battery.

21. The apparatus of claim 13 including firmware and a module to update said firmware.

* * * * *